INVENTOR
WILLIAM F. SCHRADER

United States Patent Office 3,616,680
Patented Nov. 2, 1971

3,616,680
LEAK DETECTOR
Wilhelm F. Schrader, Skokie, Ill., assignor to
Sargent-Welch Scientific Company
Filed Oct. 27, 1969, Ser. No. 869,556
Int. Cl. G01m 3/20
U.S. Cl. 73—40.7                                      5 Claims

ABSTRACT OF THE DISCLOSURE

A gas leak detecting system which includes a chamber to be tested or to receive therein articles to be tested for gas tightness under vacuum conditions. A turbo-pump having two compressor pump sections, each having inlet and outlet ends, are provided. The turbo-pump in one section evacuates the vessel through a gas flow line connected to a vacuum fore pump, and the other turbo-pump is an analyzer pump having a low molecular weight gas detector operatively associated with its inlet end, and its outlet end connected to the gas flow line extending between the other turbo-pump and the fore pump. Control means are provided in the gas flow line downstream of this connection, and, under proper conditions, the analyzer pump evacuates high weight molecular gases from the inlet end thereof while permitting the low molecular weighet trace gas to enter the inlet area for accurate detection at a controllably low pressure level.

BACKGROUND OF THE INVENTION

Leak detection systems for use in detecting gas leaks occurring, for example, in semi-conductor packages, heat exchangers, and vacuum apparatus, including components of vacuum pumps and the like, are well known. Normally, the presence of leaked gas or of one component of a leaked gas is detected by an analyzer of some sort, typically an analytical mass spectrometer, such as a mass spectrometer tuned to detect a low molecular weight gas such as helium. The gas detected may be intentionally placed around the apparatus which is tested, or it may consist of gas drawn from an enclosed article through a covering, intended to prevent leakage therethrough.

The exact construction and operation of the analyzer unit itself, such as the mass spectrometer, or the construction or nature of the article or vessel in which the leak is to be detected do not form a part of the present invention, and reference thereto will be made only for purposes of illustrating various features of the present invention. At present, it is known to use leak detectors in association with vacuum pumps capable of producing a high vacuum and which are customarily associated with a low vacuum fore pump, typically a mechanical vacuum pump of a type likewise not forming an novel part of the present invention per se.

The use of oil diffusion, pumps, or other forms of hibh vacuum pumps in series with each other and having a test line connected therebetween is also known, with such arrangement being only one of a number of prior art arrangements adapted to detect leaks in evacuated systems or vessels. It is customary for such detectors to operate on the principle of providing an adjustable throttle valve through which a small volume of all gases present is adapted to flow, with the presence of helium or other gas to be detected being accomplished at a point downstream of such throttle valve and being upstream of one diffusion pump, the detector being protected by a cold trap or the like. It is known to direct gas flow from a test vessel, sniffer probe, or the like, through a high vacuum diffusion pump and into a fore pump, detecting the level of helium or other low molecular weight gas in a spectrometer chamber lying upstream of the diffusion pump and protected from undesired contamination by a cold trap.

Although the systems referred to above have been, to a certain extent, successful in functioning to bring about their intended result, there has been room for improvement in leak detection. This is particularly true in relation to problems such as oil contamination, which is known to exist in systems using oil diffusion pumps. It is also known that prior art leak detectors have, to a greater or less extent lacked the sensitivity desired, particularly when the detectors are adequately protected against sudden or unexpected overload in the form of an excess of trace gas or other gas.

It is also known that prior leak detectors have been, in certain cases, unduly complex, and expensive, unreliable, and troubled with problems attending the use of complex valves, throttle arrangements and the like. It is also known that prior art apparatus and methods have not provided different means of adjusting the sensitivity of the analyzer and the vacuum level in areas communicating therewith, and in particular, simple and effective methods and apparatus for varying sensitivity level and the like, while either not affecting or bringing about only a minor variation in, the volume of gas flowing through the principal vessel evacuating pump.

In view of the above shortcomings of prior art methods and apparatus, an object of the present invention is to provide an improved leak detector apparatus.

Another object is to provide a leak detector apparatus making use of one or more turbo-pumps operating in the free molecule flow pressure range.

Another object is to provide an apparatus in which a turbo-pump is used to separate high molecular weight gas portions from a leaked or evacuated gas from low molecular weight portions thereof, so that a suitable vacuum level may be maintained in the inlet portion of an analyzer turbo-pump in the presence of a detachable amount of low molecular weight gas.

Still another object is to provide a turbo-pump for evacuating all but the low molecular weight gases from a gas detector, particular under carefully controllable conditions.

Another object is the provision of an apparatus utilizing a turbo-pump arrangement having two compressor sections, one adapted to evacuate the vessel to be tested and the other to permit the gas to be detected to reach a detector while excluding other gases from the detector region.

Another object is to provide a leak detector arrangement in which a principal portion of the gas to be removed from a test vessel is taken therefrom by a first turbo-pump, the outlet of which communicates through a fore pump vacuum line with the inlet of a fore pump, and in which a second turbo-pump, is disposed with the outlet thereof associated with the fore pump vacuum line so that, under conditions of little or no net gas flow from the second pump into the fore pump, a trace gas may nevertheless pass through the second turbo-pump and detected upstream of the turbo-pump.

Another object is to provide an arrangement for leak detecting in which turbo-pumps are utilized for evacuating a test vessel and for permitting flow of a trace gas upstream of one pump, and in which trace gas sensitivity may be varied by varying the rotational speed of turbo-pump impeller.

A still further object is the provision of valve means operatively associated with the discharge ends of a pair of turbo-pump assemblies having a common drive connection but being isolated spatially from each other, whereby flow of a trace gas to a detector associated with one turbo-pump may be controlled while evacuating the test vessel through the other turbo-pump and displacing gas therein into the inlet of a fore pump associated with the apparatus.

These objects, and other objects and advantages of the invention, are accomplished by providing, in one embodiment of the invention, a turbo-pump assembly having a pair of compressor assemblies disposed in a common cylindrical casing and separated from each other by a substantially gas impermeable wall, a gas detector associated with the inlet of one pump and a line to a vessel to be tested associated with the inlet of the other pump, the outlet of each pump being operatively connected, through suitable control means, to a fore pump adapted to receive, through the inlet thereof, a substantial portion of the gas volume evacuated from the test vessel.

The exact manner in which this invention accomplishes these objects and others which are inherent therein, will become more apparent when reference is made to the description of the detailed description of the preferred embodiments of the invention set forth herein by way of example, and to the accompanying drawings forming a part hereof, in which like reference numerals indicate corresponding parts throughout.

DESCRIPTION OF THE PREFERRED EMBODIMENTS OF THE INVENTION

Figure 1:
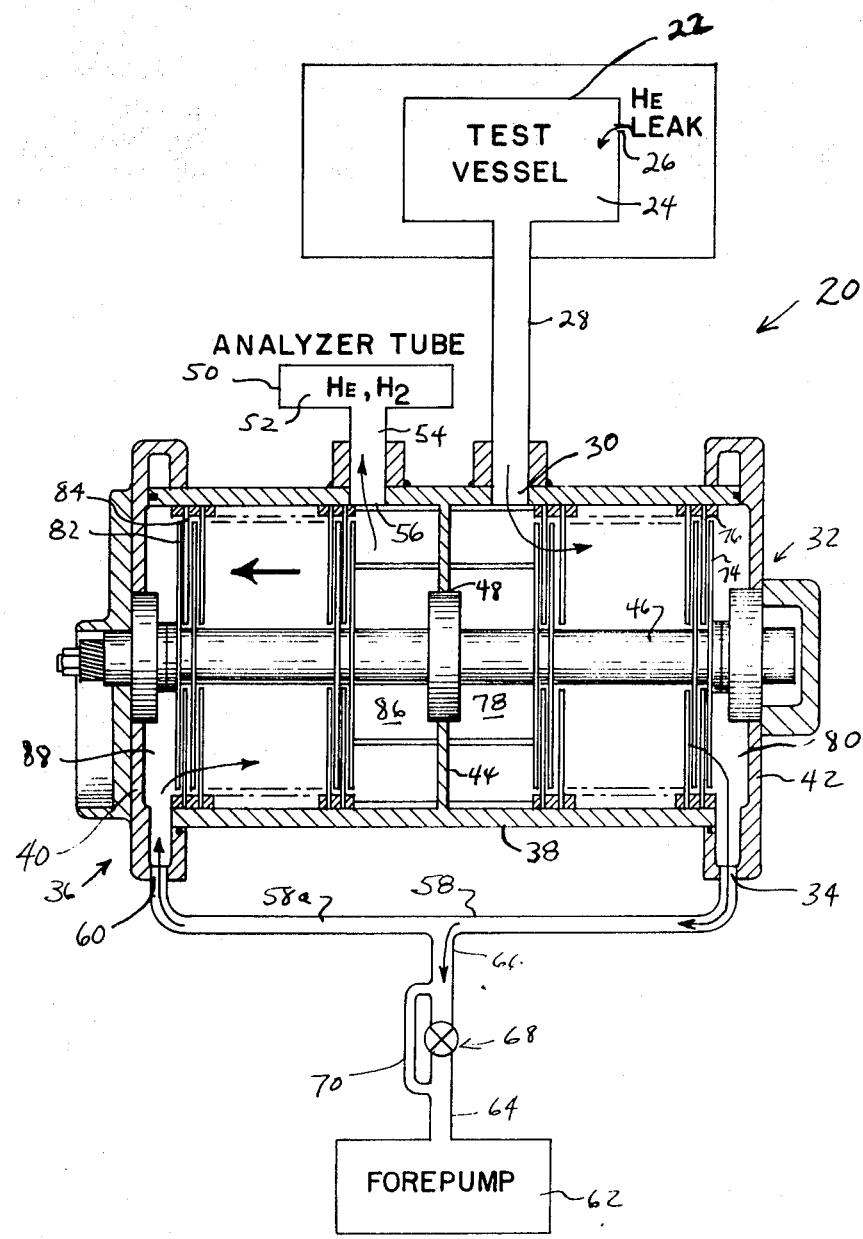
FIG. 1 is a schematic view of the leak detector of the invention, showing a vertical sectional view of the turbo-pump of the invention.

Referring now to the drawings in greater detail, FIG. 1 shows a leak detector apparatus 20 for detecting leaks through a wall portion 22 of a vessel 24, which may unintentionally include an opening 26 therein or which may include an opening intentionally placed therein. A test vessel evacuation line 28 is connected to the inlet portion 30 of a vessel evacuating turbo-pump assembly 32 having an outlet 34. An analyzer turbo-pump assembly 36 is disposed in an axially aligned relation with the test vessel evacuation pump 32, the outer wall portions of both pumps 32, 36 being defined by a common cylindrical exterior casing 38 having end portions 40, 42, and a substantially gas impermeable partition 44 disposed centrally thereof and being sealed from a rotatable impeller shaft 46 by a vacuum seal 48. Referring now to the analyzer turbo-pump unit 36, it may be seen that a gas detector unit 50 is operatively associated therewith, having a detector element 52 therein and being connected, as by a tube 54 to the inlet 56 or upstream end of the analyzer pump unit. A line 58 extends between the outlet 34 of the test vessel evacuation turbo-pump assembly 32 and the outlet 60 of the analyzer turbo-pump assembly 36. A fore pump 62 of known construction is connected through line 64 to an opening 66 in the line 58. Line 64 includes control means in the form of an adjustable valve 68 disposed therein, and a line 70 acting as a shunt or by-pass for gases passing through line 64 upstream of the valve 68.

Referring now to the two turbo-pump assemblies 32, 36, it will be seen that the right hand or vessel evacuation turbo-pump assembly includes a plurality of bladed rotors 74 disposed on shaft 46 and interleaved between a plurality of stators 76 which are fixed in relation to the casing 38. Rotation of the shaft 46 serves to propel gases in the free molecular flow pressure range from the low pressure range 78 of pump 32 adjacent the inlet 30 to the higher pressure region 80 adjacent the outlet 34. As will be set forth in further detail herein, the pressure rise through such turbo-pump may, merely by way of example, range from about $10^{-8}$ torr at the inlet up to about $10^{-3}$ or more at the outlet. Referring now to the left hand or analyzer pump assembly 36, it will be seen that a plurality of rotors 82 are mounted on shaft 46 and interleaved between stators 84, and that upon rotation of the shaft 46 in a desired direction, dense gases will be propelled from the upstream or low pressure region 86 of pump assembly 36 to the high pressure region 88.

The exact functioning of this analyzer turbo-pump assembly will be described in further detail herein, however, in the illustrated embodiment, it can be seen that both inlets 30, 56 are disposed adjacent an axially inner part of the pump assemblies 32, 36, and that the outlets 34, 60 are at the axially outer ends thereof. Gas flow of this character occurs because the rotors forming a part of pump assembly 32 are substantial mirror images of their counterparts in pump assembly 36, and because stators 76 are substantially mirror images of their counterparts 84.

Referring now to the operation of the leak tester 20, it will be assumed that the article to be tested is the test vessel 24 itself, such as would be the case if vacuum tests were applied to the rotor casing of a turbo-molecular vacuum pump intended to provide vacuum levels in a portion thereof levels down to $10^{-12}$ torr or even high vacuum. With the line 28 connected to the inlet 30 of the vessel evacuation pump assembly 32, the fore pump 62 is operated, typically providing an inlet pressure of $10^{-3}$ torr. As common shaft 46 is rotated at high r.p.m., typically 10,000 to 20,000 r.p.m. or more, a vacuum level is created in the low pressure region 78 of from about $10^{-6}$ to $10^{-12}$ or more, typically $10^{-8}$. Gas flow might, in the case of a $10^{-10}$ torr pressure level, be 100 liters per second through the pump 32, and substantially all of this gas would pass through outlet 34 into line 58, and thence through lines 64 and 70 into the inlet of the fore pump. At the same time, with shaft 46 rotating as set forth above, the effect within pump assembly 36 is to exhaust gases in the low pressure region 86 and transfer them into the high pressure region 88 for discharging out exit 60 into line 58.

However, in accordance with known principles, and assuming that no large gas volume source is available at port 56, the analyzer turbo pump assembly would soon tend to reach equilibrium conditions wherein back flow or upstream flow is substantially equivalent to downstream flow. As is well known, however, the distribution of gases between chambers 86 and 22 is significantly different in case of gases of different molecular weight. Thus, because of their lower weight and higher velocity, helium and hydrogen molecules flow upstream in significant quantities compared to the number of molecules of oil or other hydrocarbon vapors, the water vapors, nitrogen, oxygen, carbon dioxide, and the like, flowing upstream. Consequently, a large proportion of helium molecules are present in chamber 86 in relation to the number of other gas molecules, particularly in relation to the proportion of helium molecules which would be present in a given gas volume under standard pressure conditions. Thus, although helium comprises only a minute percentage of air at atmospheric pressure, a very large proportion of the gas molecules in region 86 are helium. But since these gases are present against a background pressure of $10^{-4}$ down to $10^{-8}$, for example, such values being selected as those required for effective operation of the helium detector unit 52, they are easily detected as an indicator of the vacuum-tight condition of the test vessel 24.

Figure 2:
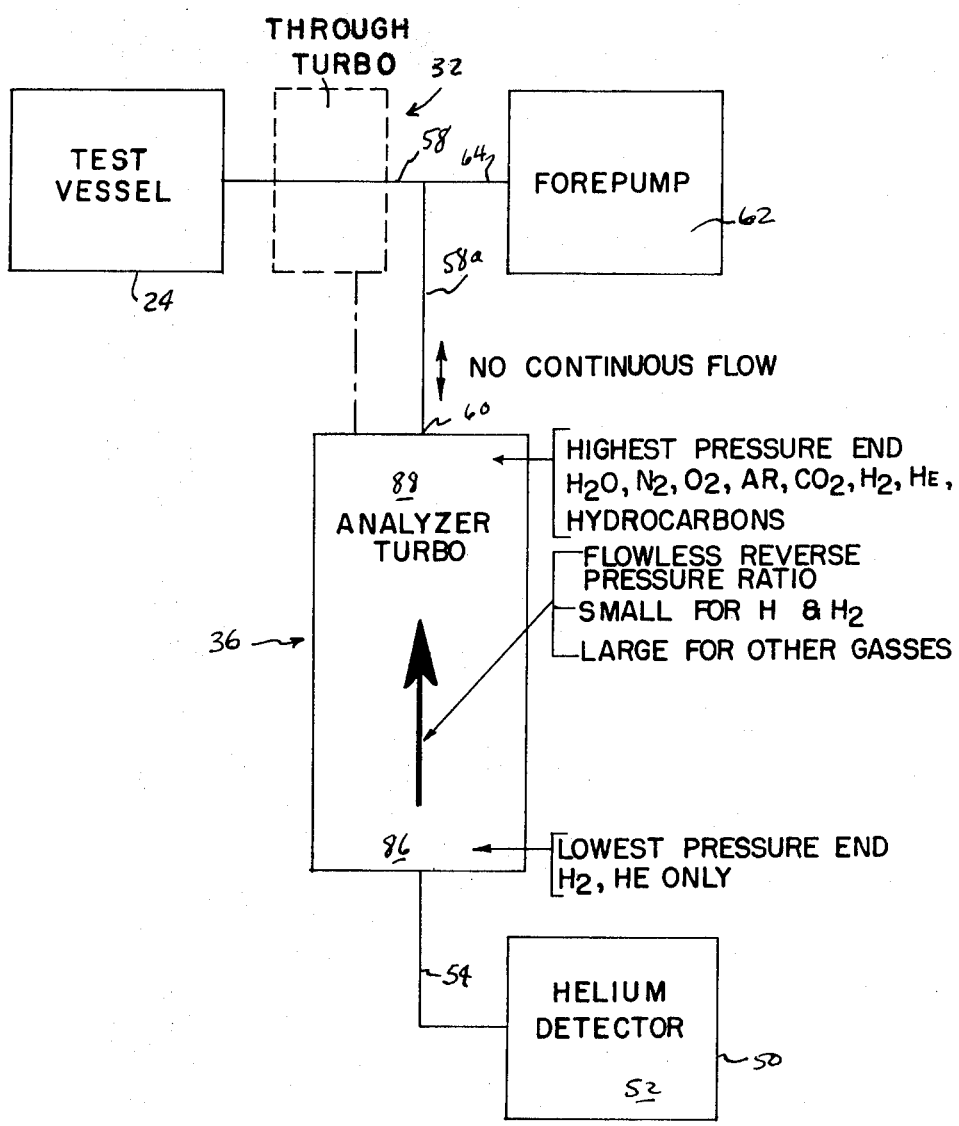
FIG. 2 is a block diagram illustrating the principal of the invention, and showing certain components operatively associated in use as being separated for purposes of illustration.

FIG. 2 illustrates a simplified, somewhat schematic drawing of a leak detector according to the present invention which is adapted to illustrate that the test vessel 24 is evacuated principally by the fore pump 62, with substantially the entire volume flow into and out of the mechanical fore pump being passed through the vessel evacuating turbo pump assembly 32. Accordingly, the volume capacity of the pump assembly 32 is sufficiently large for the purpose under consideration, that is, to evacuate the entire volume of vessel 24 without the requirement that another pump be used. FIG. 2 also shows that line 58 communicates with the vacuum forepump line 64 but that there is neither significant continuous flow of the entire contents of the stream in forepump line 64 into the outlet 60 of the analyzer turbo pump 36 nor significant flow from the pump 36 into line 64.

Thus, the analyzer turbo pump 36 is operated in a mode so as to act as a gas sieve or filter so that, at the high pressure end thereof, water vapor, nitrogen, oxygen, argon, carbon dioxide, hydrocarbons and the like are present in substantial quantities, with hydrogen and helium also being transiently present in said area. In the lowest pressure or inlet portion 86 of the analyzer turbo pump 36, virtually all of the pressure is created by the partial pressures of hydrogen and helium, but the overall pressure is still sufficiently low so that the leak detector may be operated without fear of damage and well within its optimum operating range.

Although the exact design or dimensions of the turbo pump of the invention and particularly turbo pump 36 do not per se form a novel part of this invention, certain criteria are used in selecting the characteristics of the pump and the conditions under which it is operated. For example, each gas possesses a particular pressure ratio which, for purposes hereof, is a ratio of the pressure of the particular gas in question in the outlet line in relation to the pressure of such gas in the detector associated with the inlet of the analyzer turbo pump 36. It is therefore convenient, by way of example, to plot the rotational speed of the pump against a function of this pressure ratio, in a manner known to those skilled in the art, to determine optimum conditions for leak detection. In the foregoing description of a preferred embodiment of the present invention, a sample turbo pump comprised of two turbo sections and having stators rotated by a common shaft was illustrated, since this construction affords a number of advantages, such as ease of construction and control. It will be understood, however, that the pump for evacuating the test vessel could be a separate turbo pump, or could be a pump other than a turbo pump, and, with a large enough leak volume so that effective pressure could be maintained by a fore pump alone, even no pump at all. Thus, it is apparent that the principle of utilizing the turbo pump as an analyzer in conjunction with the use of the detector is useful in various different environments. Furthermore, by way of example, it is possible to provide means (not shown) for adjusting the rotation speed of the common turbo shaft 46, or the speed of an individual turbo shaft in the event the shafts are not formed as a unit, or if a different type of test vessel evacuator is used. In this way, pressures in the region 86 may be readily controlled.

Referring now to the adjustment of valve 68 and the relation thereof to the shunt 70, it is preferred that this arrangement be used since, as a rule, a major portion of the capacity of the fore pump will be directed to receiving the entire output of the vessel evacuating turbo pump, and the amount of volume in that portion of the line 58 leading to the outlet of the analyzer turbo pump will be small, although it will be significantly affected by only a relatively small change in the flow to the fore pump.

Detectors constructed according to the present invention have been accurate and reliable in use and perform excellently, particularly in respect to maintaining pressure in the portion of the analyzer turbine associated with the helium detector at an optimum value to provide maximum sensitivity, minimum contamination and accuracy and extremely long life.

Accordingly, it will be seen that the present invention provides an improved leak detector possessing a number of advantages and characteristics, including those referred to herein and others which are inherent in the invention.

I claim:
1. A system for detecting gas leaks into at least a portion of a test vessel to be evacuated, said system including a turbo-pump having inlet and outlet ends adapted to operate in the free molecular flow pressure range for evacuating said vessel, means for connection between the inlet of said evacuating turbo-pump and said vessel, a vacuum fore pump for operative association with said evacuating turbo-pump for evacuating said vessel, a vacuum fore pump line connecting said fore pump to the outlet of said evacuating turbo-pump, an analyzer turbo-pump adapted for operation in the free molecule pressure range, said analyzer turbo-pump having an inlet and an outlet, a low molecular weight gas detector operatively associated with said inlet and means for connecting said outlet of said analyzer turbo-pump with said vacuum fore pump line, said analyzer turbo-pump and said evacuating turbo-pump comprising a single turbo-pump having a pair of compressor sections separated from each other by a substantially gas impermeable partition.

2. A system as defined in claim 1 in which control means are provided in said vacuum fore pump lines for controlling the volume of flow therethrough.

3. A system as defined in claim 1 in which said gas detector comprises a mass spectrometer tuned to detect the presence of helium.

4. A system as defined in claim 1 in which said means connecting said vessel to be evacuated to said vessel evacuating turbo-pump, said vacuum fore pump line and said means for connecting said outlet of said analyzer turbo-pump to said vacuum fore pump line are sized so as to provide a very large gas flow volume through said vessel evacuating pump in relation to the gas volume passing through said analyzer turbo-pump.

5. A system as defined in claim 1 in which said analyzer turbo-pump, said detector, and said means for connecting the outlet of said analyzer to said vacuum fore pump line are constructed and arranged, in combination with means for operating said compressor portion of said analyzer pump, so as to permit said detector to be supplied with a desired portion of said lower molecular weight gas and so as to exclude a major portion of higher molecular weight gases from the inlet region of said analyzer pump.

References Cited
UNITED STATES PATENTS

| | | | |
|---|---|---|---|
| 3,342,990 | 9/1967 | Barrington et al. | 73—40.7 X |
| 3,416,359 | 12/1968 | Durbin et al. | 73—40.7 |
| 3,520,176 | 7/1970 | Becker | 73—40.7 |

LOUIS R. PRINCE, Primary Examiner

W. A. HENRY II, Assistant Examiner

UNITED STATES PATENT OFFICE
CERTIFICATE OF CORRECTION

Patent No. 3,616,680          Dated   November 2, 1971

Inventor(s)   Wilhelm F. Schrader

It is certified that error appears in the above-identified patent and that said Letters Patent are hereby corrected as shown below:

```
Column 1, line 26, "weighet" should read --weight--
Column 1, line 55, "an" should read --any--
Column 1, line 57, after "diffusion" delete the comma
Column 1, line 58, "hibh" should read --high--
Column 4, line 22, after "thereof" insert --of--
Column 4, line 44, the numeral "22" should read --88--

Column 5, line 48, "rotation" should read --rotational--
```

Signed and sealed this 3rd day of October 1972.

(SEAL)
Attest:

EDWARD M. FLETCHER, JR.
Attesting Officer

ROBERT GOTTSCHALK
Commissioner of Patents